United States Patent [19]

Klein

[11] Patent Number: 5,422,196

[45] Date of Patent: Jun. 6, 1995

[54] PRESSURE VESSEL FOR PRESSURIZED SECONDARY CELLS AND BATTERIES

[75] Inventor: Glenn C. Klein, Alachua, Fla.

[73] Assignee: Saft America, Inc., Valdosta, Ga.

[21] Appl. No.: 926,062

[22] Filed: Aug. 5, 1992

[51] Int. Cl.⁶ .......................................... H04M 04/02
[52] U.S. Cl. ...................... 429/27; 429/101;
     429/156; 429/158
[58] Field of Search .................. 429/101, 27

[56] References Cited

U.S. PATENT DOCUMENTS

| | | | |
|---|---|---|---|
| 4,950,564 | 8/1990 | Puglisi et al. | 429/101 |
| 5,168,017 | 12/1992 | Jones et al. | 429/101 |

*Primary Examiner*—Glennon H. Hollrah
*Assistant Examiner*—Brian M. Burn
*Attorney, Agent, or Firm*—Sughrue, Mion, Zinn, Macpeak & Seas

[57] ABSTRACT

A pressure vessel for pressurized secondary cells is disclosed. The vessel includes a generally cylindrical container having both ends closed by substantially flat circular discs. The container has a diameter dimension substantially greater than its axial dimension. A mechanism is provided for supporting a plurality of substantially rectangular stacked electrode plates within the container. A pair of sealed terminal connectors pass through the container, and a terminal assembly mechanism is disposed within the container for directly interconnecting the stacked plates to each terminal connector.

37 Claims, 4 Drawing Sheets

PRESSURE VESSEL FOR PRESSURIZED SECONDARY CELLS AND BATTERIES

BACKGROUND OF THE INVENTION

1. Field of The Invention

The present invention relates generally to pressure vessels for pressurized secondary cells and, more particularly, to metal gas cells such as nickel hydrogen aerospace secondary storage cells. Specifically, the present invention relates to an improved secondary storage battery made from secondary cells having improved pressure vessels for such cells.

2. Description of the Prior Art

Metal gas cells, and in particular nickel hydrogen batteries, have generally included an elongated plate stack encased within a sealed metal vessel. The vessel is generally in the form of a single cylindrical vessel having dome-shaped ends and charged with a gas under pressure, such as hydrogen. Such single cells have represented an entire battery in order to restrict the need for manufacturing more than one pressurized vessel casing. An example of such secondary cells useful as aerospace batteries is disclosed in U.S. Pat. No. 4,950,564, the contents of which are hereby specifically incorporated herein by reference.

As can be seen from the referenced patent, a plurality of stacked plates are mounted together within the single containment vessel. While this particular design has provided a secondary cell and battery which is quite effective, there are certain drawbacks to this type of structure in general. In existing designs, electrodeplates are circular in form to conform to the cylindrical enclosure. Unfortunately, the use of such circular shaped electrodes results in substantial scrap material when blanked out from larger rectangular materials. Moreover, the present design requires a multiplicity of smaller diameter positive electrodes utilizing multiple belleville washers to maintain proper stack compression for the expected long life. This complicated design, unfortunately, adds weight to the cell, and weight in aerospace applications is a critical factor. In addition, circular electrode plates require elongated plate tabs and electrical leads to connect the plates to their respective terminal connectors within the containment vessel. This again leads to complexity and weight for the cell. Therefore, there remains a need to provide a secondary cell and battery structure having the output requirements of existing designs yet having simpler construction and lighter weight, thereby enhancing the energy density capability as well as reducing the possible failure points.

SUMMARY OF THE INVENTION

Accordingly, it is one object of the present invention to provide an improved pressure vessel for pressurized secondary cells.

It is another object of the present invention to provide a metal gas cell of improved design having lower weight and higher efficiency.

Yet another object of the present invention is to provide a secondary storage battery having greater energy efficiency and reduced waste.

Still another object of the present invention is to provide an improved secondary cell having substantially fewer component parts and greater simplicity in design and construction.

To achieve the foregoing and other objects and in accordance with the purpose of the present invention, as embodied and broadly described herein, a pressure vessel for pressurized secondary cells is disclosed. The vessel includes a generally cylindrical container having both ends closed by substantially flat circular discs. The container has a diameter dimension substantially greater than its axial dimension. A mechanism is provided so as to support the plurality of substantially rectangular stacked electrode plates disposed within the container. A pair of sealed terminal connectors pass through the container, and a terminal assembly mechanism is disposed within the container for directly interconnecting the stacked plates to each of the terminal connectors. In one embodiment of the present invention, a plurality of such pressure vessels in the form of metal gas cells are interconnected to form a secondary storage battery.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
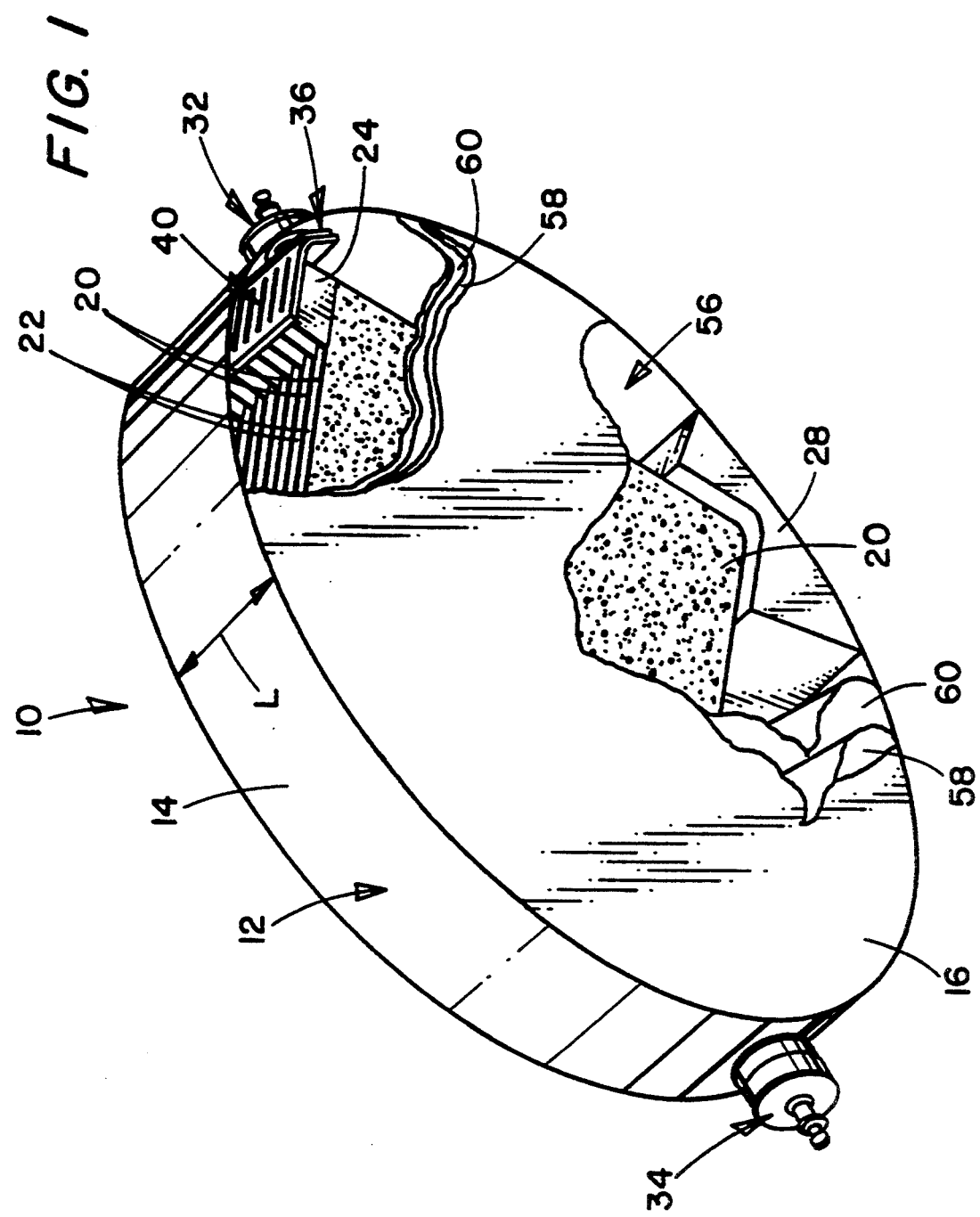
FIG. 1 is a front perspective view, with parts cut away, of a secondary cell constructed utilizing the pressure vessel of the present invention.
Figure 2:
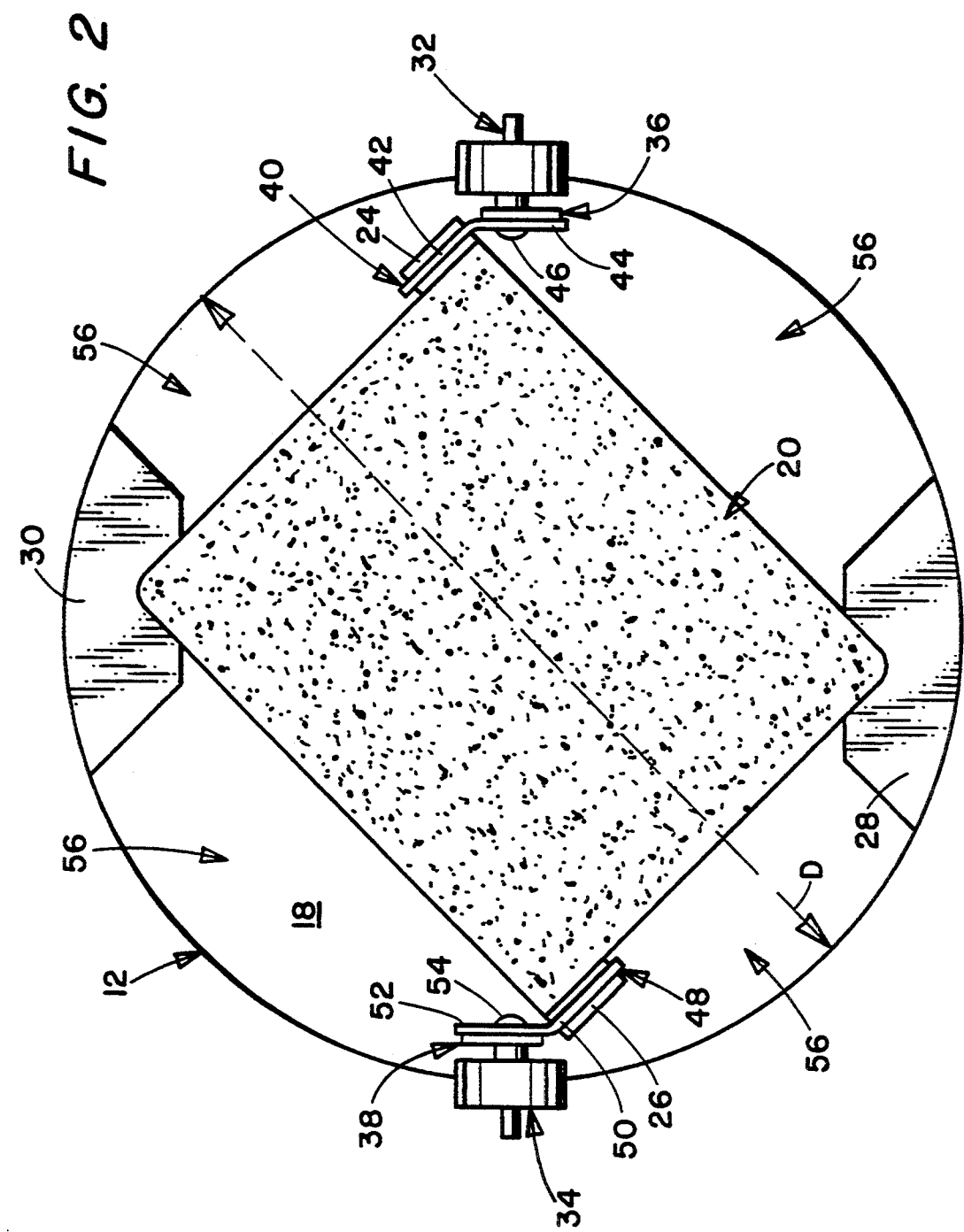
FIG. 2 is a front plan view of the embodiment illustrated in FIG. 1 with the front disc member removed therefrom.

Referring to FIGS. 1 and 2, a secondary cell 10 is illustrated. The cell 10 includes a substantially cylindrical containment vessel 12 having an outer cylindrical body 14 with each end covered by a substantially circular disc 16, 18. The cylindrical sidewall 14 and pressure vessel discs 16, 18 are thin walled metal capable of containing a fluid under a pressure suitable for operation of the cell, for example gaseous hydrogen of 600–1,200 psi. The metal utilized for the container 12 may be of any suitable light weight material, such as, Inconel 718 which is a nickel alloy manufactured by the International Nickel Company.

As can be seen from FIGS. 1 and 2, the outer diameter D of the vessel 12 is substantially greater than the outer axial length dimension L. In the preferred environment, the diameter D is typically 2–7 inches, while the counterpart dimension L is preferably 1–2 inches. Most preferably, the dimension D is 6.5 inches while the dimension L is 1.75 inches.

A plurality of stacked positive electrode plates 20 alternating with a plurality of stacked negative electrode plates 22 are mounted within the vessel 12. In preferred form, the stacked plates 20, 22 are rectangular in form as opposed to circular as typical of the prior art. This rectangular shape substantially reduces the amount of waste material created when the plates 20, 22 are stamped from larger rectangular sheet materials. Each positive plate 20 includes a connector tab 24 disposed in one corner thereof, while the negative plates each include a connector tab 26 in the opposite corner. The plates 20, 22 are maintained in position by press fitting the corners thereof not containing the tabs 24, 26 within internal pack support brackets or ledges 28, 30. In this manner, the plates 20, 22 are firmly maintained within the vessel 12 without providing unnecessary and undue support materials between the plates, for the tabs 24, 26 are free to be connected to the terminals as described below.

Terminal connectors 32, 34, of typical well-known design, are provided on the exterior sidewall 14 of the vessel 12, and are each interconnected to a terminal assembly, 36, 38 disposed within the container 14. The tabs 24 interconnect with the terminal assembly 36 by providing a bus bar 40 which has a primary comb 42 and a secondary comb 44. The primary comb 42 includes a plurality of slots therein designed to receive the tabs 24 to securely fasten the tabs 24 to the primary comb 42. The secondary comb 44 has an aperture therein for a connecting member 46 to electrically connect the secondary comb 44 to the terminal assembly 36 and thence to the positive terminal 34. In similar fashion, a second bus bar 48 is provided having a primary comb 50 with slots therein for receiving the tabs 26. A secondary comb 52 is also provided and includes an aperture for receiving connecting member 54 to attach the secondary comb 52 electrically to the terminal 34 by way of the terminal assembly 38.

The rectangular shape of the plates 20, 22 provide for a plurality of substantial void volumes 56 between the plates 20, 22 and the interior surface of the container sidewall 14. The void volumes 56 provide the void volume within the cell 10 which is necessary to establish equilibrium pressures consistent with the particular electrochemical couple provided within the cell 10. The particular electrochemical couple will be dependent on the electrolyte chosen, the selected gas contained within the cell 10, and the materials for the plates 20, 22. All of the these materials are well known to the art and disclosed in the referenced patent and will therefore not be discussed in any further detail herein.

Disposed immediately inwardly of the pressure vessel discs 16, 18 is a thermal insulating layer 58 which may be made of any appropriate material and is preferably made from polypropylene. Disposed inwardly of the layer 58 is yet another layer or plate 60 which is an electrolyte reservoir plate that seals both ends of the cylindrical container 12. The electrolyte reservoir plate 60 is utilized on each end of the plate stack 20, 22 to resist positive plate 20 expansion as well as to maintain positive pressure against the plates stack assembly 20, 22. The electrolyte reservoir plate 60 also acts as a source or reservoir for additional electrolyte to the positive plates 20 as required during long-term cycling of the cell 10. This is due to the fact that the plate 60 is preferably comprised of a porous metal material and preferably porous nickel in the form of nickel foam, nickel felt and/or nickel sponge. The porosity of the nickel material for the plate 60 is preferably 75-95% void volume. The use of the layer 60 eliminates the need for $ZrO_2$ wall wicking utilized in nickel hydrogen cell designs as illustrated in the referenced patent.

As can be seen from the illustrated embodiments in FIGS. 1 and 2, the terminals 32, 34 are preferably spaced on opposite sides of the sidewall 14, approximately 180° apart. However, in another preferred embodiment, which is not illustrated, terminals 32, 34 may be spaced approximately 90° apart along the sidewall 14 of the container vessel 12.

Figure 3:
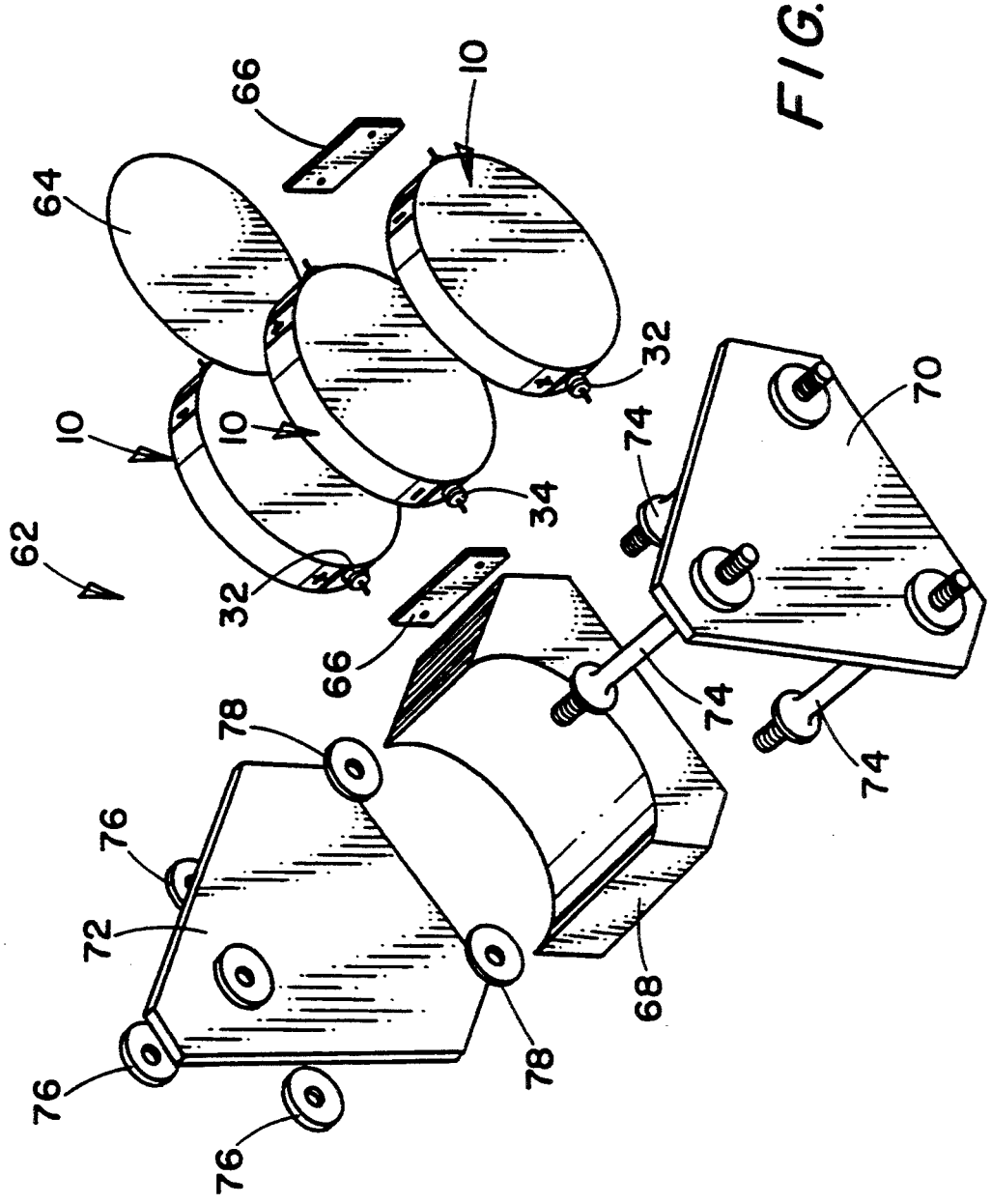
FIG. 3 is an exploded view of a three cell battery made utilizing the cell construction of the present invention.

Referring now to FIG. 3, a multi-cell battery design 62 is illustrated. The battery 62 preferably includes three of the cells 10 placed end to end and separated only by an electrical insulator disc 64 (only one of which is shown). In preferred form, the electrical insulator 64 is a polyimide disc which is placed between each cell 10 as well as on the end faces of the front and rear cells. As can be seen from FIG. 3, the cells 10 are oriented in alternating manner with the positive terminal connector 32 being placed adjacent a negative terminal connector 34 of the adjacent cell 10. In this manner, a short metal connecting member 66 may be utilized to interconnect the cells 10 in electrical series. The cells 10 are placed together with the insulator 64 therebetween and positioned within a support base 68, which is preferably a polyurethane base. Front and rear restraint plates 70, 72 are positioned on either side of the stack of cells 10, and tie rods 74 are then secured to tie rod nuts 76 with spacers 78 as required. The tie rods 74 are tightened with the nuts 76 so as to provide an adjustable tension mechanism between the two restraint plates 70, 72.

The improved battery design as illustrated results from stacking the cells end to end, that is flat cylindrical disc against flat cylindrical disc. This design eliminates the voluminous space frame designs currently required for nickel hydrogen technology. The thin wall cylindrical portions 16, 18 of the cell 10 are sized to properly resist deformation on an individual basis. However, the pressure response from the cell sidewall 16, 18 is offset at each end of the stack of individual cells 10 by the restraint plates 70, 72. The tie bars 74 provide adjustable tension between the two plates 70, 72 and are used to maintain both structural integrity of the battery assembly as well as pressure integrity of the cells 10.

Figure 4:
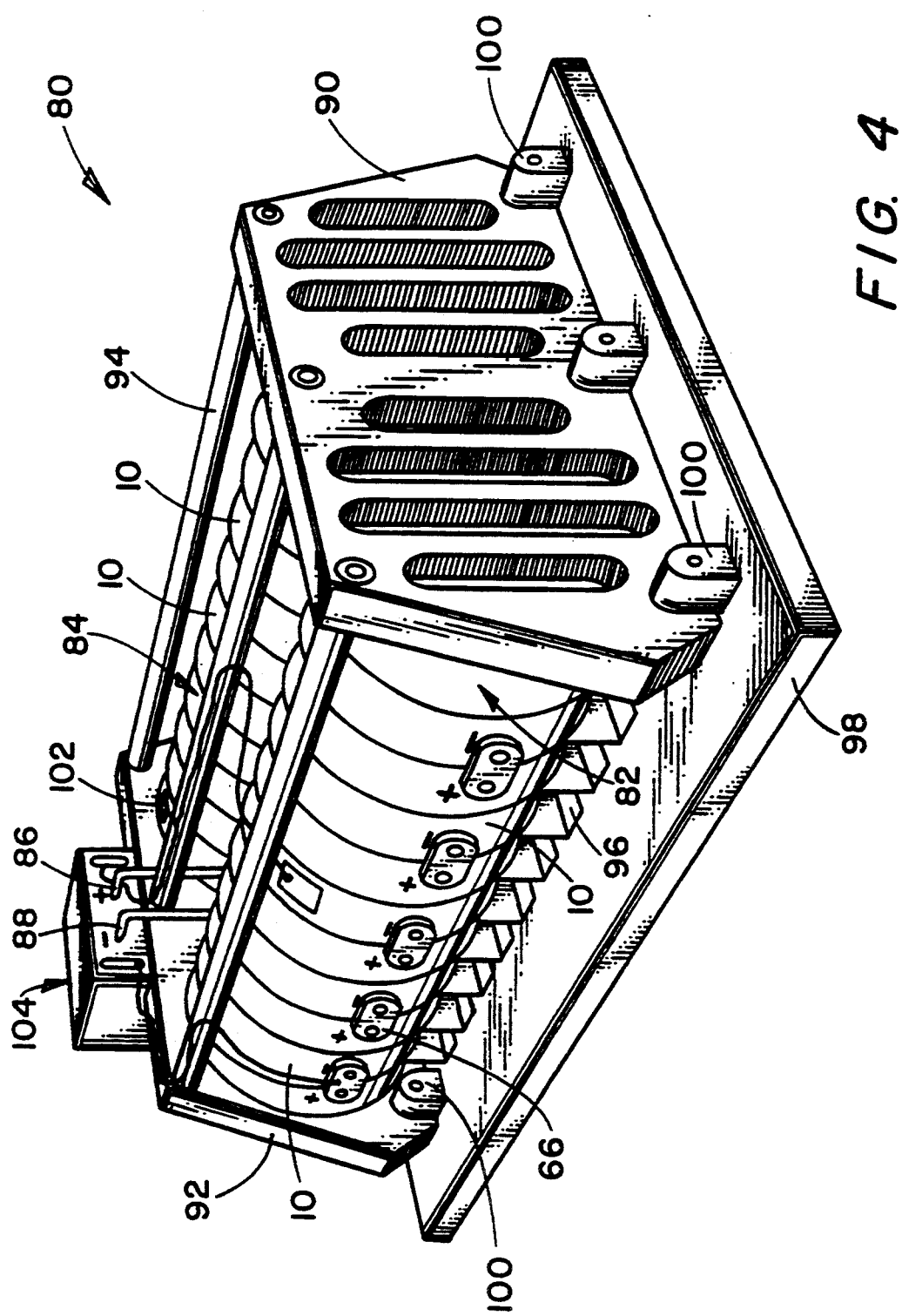
FIG. 4 is a front perspective view of a multi-cell battery constructed utilizing cells in accordance with the present invention.

Referring now to FIG. 4, a more complicated battery design is illustrated therein. In this battery embodiment, a battery 80 is provided having a plurality of cells 10, as previously indicated, stacked together. In the illustrated embodiment, eleven cells 10 are stacked in one column 82, while another set of eleven stacked cells 10 are provided in the second column 84 aligned adjacent to the first column 82. It should be noted, however, that any number of cells 10 can be used in the columns 82, 84, depending on battery output requirements. The positive and negative electrodes of the cells 10 in the columns 82, 84 are interconnected as previously discussed utilizing connecting bars 66. All of the cells 10 in the columns 82, 84 are connected in series so as to have one battery positive terminal 86 and one battery negative terminal 88. In the illustrated embodiment, the columns 82, 84 of the cells 10 are restrained by restraining plates 90, 92 and are interconnected by tie rods 94 in a fashion similar to that illustrated in FIG. 3.

Since battery 80 is intended for aerospace applications, heat dissipation is of major import. In order to assist in heat control of the cells 10, thermal fins 96 are provided. In this instance, each cell 10 includes a thermal fin 96 thermally, although not electrically, interconnected thereto, and then mounted to a radiator base plate 98. In preferred form, the thermal fins 96 also include heater elements therein. The purpose of the thermal fins 96 and the radiator 98 are to control the heat of the cells 10 so as to maintain the cells 10 at proper operating temperatures in aerospace applications. Assisting in mounting the restraint plates 90, 92 to the radiator base plate 98 are a plurality of active restraint members 100.

When mounting the battery 80 and restraint plates 90, 92, the pressure imposed by the plates 90, 92 by the tension rods 94 is monitored by strain gages 102 mounted on the cells 10 in several different locations. The battery heaters, battery conditioners, and battery power are all contained within a control module 104.

The battery design 80 illustrated in FIG. 4 provides a more compact battery design using shorter intercell connectors. Improvement of the individual cells 10 as described above provides for substantial improvement in the battery 80 itself due to reduced battery resistance and reduced battery weight.

An alternate embodiment not illustrated herein but envisioned by the present invention is a battery assembly wherein the individual cells 10, in lieu of being mounted end to end in stacked formation as illustrated in FIGS. 3 and 4, are mounted side-by-side in generally the same plane with the positive and negative terminals thereof interconnected in electrical series similar to that illustrated and discussed relative to FIGS. 3 and 4. In this particular embodiment, however, the restraining plates 90, 92 would be formed across all of the faces 16, 18 of all of the cells 10. This particular application is envisioned for use in smaller sized satellite applications.

The cell 10 of the present invention eliminates the spherical end dome that is utilized on current design pressure vessels, which designs are all characterized by the need for critically controlled processes for hydroforming. The square plate design of cell 10 eliminates the various and numerous components characterized by current cell design utilized in a central support core, that is it eliminates the core, core nut, end plates, weld rings, belleville washers, plate tab extensions, and core insulator rings. Reliability has been improved both by the elimination of excess parts as discussed, as well as by the resultant elimination of complex stack assembly procedure relative to battery applications.

The elimination of plate tab extensions as required in the prior designs provides a significant weight reduction and significantly reduces the plate to tab resistance during current flow for improved discharge performance. It further results in the elimination of major thermal generation which results from the electrical resistance inherent in prior art secondary cell design utilizing tab extensions. The use of rectangular electrode plates also allows true processing in strip form, including the adaptation of wet slurry on positive electrodes, and significantly reduces the scrap associated with circular electrodes cut from rectangular strips as discussed above. Moreover, the use of rectangular electrodes allows ancillary components with the stack assembly to be of similar rectangular shape and again eliminates the scrap normally associated with previous designs wherein circular components have blanked out from larger rectangular materials.

Additional electrochemistry efficiency is gained with positive and negative terminals which are disposed opposite each other in the illustrated embodiment due to more normally distributed equipotential on the plate electrodes. As a result, a 10–20% improvement in the power-to-weight ratio is obtained by the cell constructed in accordance with the present invention as compared to prior art cells previously discussed.

When the cell of the present invention is applied to battery design as illustrated in FIGS. 3 and 4, a smaller overall design envelope is obtained and the side to side stacking feature is more amenable to the incorporation of additional cells where required. A significantly shorter inter-cell connector results in both reduced weight and reduced electrical resistance, and the battery design is directly adaptable to existing nickel cadmium base plate radiators. Since the battery design of the present invention is simplified, the associated fabrication and assembly techniques are generally also simplified. A 20–30% improvement in the power-to-weight ratio of the battery illustrated in FIG. 4 is obtained utilizing the present invention.

As can be seen from the above, the present invention provides a significantly improved pressure vessel design for pressurized secondary cells of the gaseous metal cell design type. As a result of the present invention, weight requirements are reduced, heat is more readily dissipated, and internal electrical resistance is also reduced. The complex nature of the battery cell construction is also simplified since the number of piece parts necessary to manufacture both the cell as well as the battery of the invention is reduced. The present invention provides a significantly enhanced power-to-weight ratio and a much more adaptable and less expensive cell and battery.

The foregoing description and the illustrative embodiments of the present invention have been shown in the drawings and described in detail in various modifications and alternate embodiments. It should be understood, however, that the foregoing description of the invention is exemplary only, and that the scope of the invention is limited only to the claims as interpreted in view of the prior art.

What is claimed is:

1. A pressure vessel for pressurized secondary cells, said vessel comprising:
   a generally cylindrical container having both ends closed by substantially flat circular discs, said container having a diameter dimension substantially greater than its axial dimension;
   means for supporting a plurality of substantially rectangular stacked electrode plates within said container;
   a pair of sealed terminal connectors passing through said container; and
   terminal assembly means disposed within said container for directly interconnecting said stacked plates to each said terminal connector.

2. The vessel as claimed in claim 1, wherein said terminal connectors are disposed on the circumferential sidewall of said cylindrical container.

3. The vessel as claimed in claim 2, wherein said terminal connectors are spaced approximately 90° apart.

4. The vessel as claimed in claim 2, wherein said terminal connectors are spaced opposite each other approximately 180° apart.

5. The vessel as claimed in claim 1, wherein each said substantially flat circular disc comprises an outer pressure vessel disc member, a thermal insulating layer disposed inwardly thereof, and an electrolyte reservoir plate disposed inwardly of said insulating layer to resist positive plate expansion and maintain positive pressure against said electrode plates.

6. The vessel as claimed in claim 1, wherein each said container includes an electrolyte reservoir plate disposed inwardly of said substantially flat circular disc for resisting positive plate expansion and maintaining positive pressure against said stacked electrode plates.

7. The vessel as claimed in claim 6, wherein said electrolyte reservoir plate comprises high porosity nickel.

8. The vessel as claimed in claim 1, wherein said plate support means defines free void volume between said plates and the interior sidewall surface of said container to establish equilibrium pressures within said container.

9. The vessel as claimed in claim 1, wherein said terminal assembly means comprises a pair of terminal bus bars each directly interconnecting said plates with the interior portion of said terminal connectors.

10. A metal gas cell comprising:
a generally cylindrical container having both ends closed by substantially flat circular discs, the axial length of said container being substantially less than the diameter thereof;
a plurality of alternating positive and negative stacked plates positioned between said discs, said plates being substantially rectangular in shape;
means for internally supporting said rectangular plates;
terminal assembly means disposed within said container;
terminal connector means disposed exterior to said container and interconnected to said terminal assembly means; and
means for directly attaching said plates to said terminal assembly means.

11. The cell as claimed in claim 10, wherein said cell further includes an electrolyte reservoir plate disposed inwardly of each said disc and comprised of high porosity nickel.

12. The cell as claimed in claim 11, wherein the porosity of said nickel electrode reservoir plate is sufficient to provide additional electrolyte to said positive plates as required during long term cycling.

13. The cell as claimed in claim 10, wherein said plate support means comprises internal pack support members for said plates which define free void volume between said plates and the inner surface of said cell sufficient to establish equilibrium pressures within said cell.

14. The cell as claimed in claim 13, wherein said plate support means comprises a pair of said pack support members supporting a pair of opposing corners of said stacked plates.

15. The cell as claimed in claim 10, wherein said stacked plates each include a pair of connection tabs.

16. The cell as claimed in claim 15, wherein said terminal connector means comprises a pair of terminal connectors, said terminal assembly means comprises a pair of interior terminal connection members interconnected to said terminal connectors, and wherein said attaching means comprises a pair of bus bars, one said bus bar interconnecting the tabs of said positive plates to one said inner terminal connection member and the second said bus bar interconnecting the tabs of said negative plates to the second inner terminal connection member.

17. The cell as claimed in claim 16, wherein said terminal connectors are positioned substantially opposite each other on the circumferential sidewall of said cylindrical cell.

18. In a secondary cell having a generally cylindrical containment vessel, a pair of sealed electrode terminal connectors passing through said vessel, and a plurality of stacked alternating positive and negative electrode plates disposed within said vessel and electrically interconnected to said electrode terminal connectors, the improvement wherein said stacked plates are rectangular in shape and are supported on a pair of opposite corners by a pair of plate support ledges.

19. The improvement of claim 18, wherein the remaining opposite corners of said plates include tab members directly connected to a pair of bus bars interconnected to said terminal connectors.

20. In a secondary cell having a generally cylindrical containment vessel, a pair of sealed electrode terminal connectors passing through said vessel, and a plurality of stacked alternating positive and negative electrode plates disposed within said vessel and electrically interconnected to said electrode terminal connectors, the improvement wherein said generally cylindrical vessel has a diameter dimension substantially greater than the axial length thereof.

21. The improvement of claim 20, wherein said cylindrical vessel is closed at each end by a pair of substantially flat circular discs.

22. The improvement of claim 21, wherein said vessel further includes a pair of electrolyte reservoir plates disposed axially inwardly of said flat circular discs to resist positive plate expansion, maintain positive pressure against said stacked electrode plates, and provide additional electrolyte to positive plates as required during long-term cycling of said secondary cell.

23. The improvement of claim 22, wherein said electrolyte reservoir plate comprises porous nickel.

24. The improvement of claim 23, wherein said porous nickel is selected from group consisting of nickel felt, nickel foam, and nickel sponge.

25. The improvement of claim 23, wherein said porous nickel metal comprises a porosity of approximately 75-95% void space.

26. A secondary battery comprising:
A plurality of secondary cells disposed end to end in stacked form, each said cell being self-contained and including a generally cylindrical containment vessel having a diameter substantially greater than its axial length and a pair of positive and negative terminal connectors disposed on the circumferential sidewall of each said substantially cylindrical vessel;
means for interconnecting the positive terminal connector of one said cell with a negative terminal connector of an adjacent cell in electrical series; and
means disposed at either end of said stacked cells for maintaining pressure integrity of the end cells and structural integrity of said battery.

27. The battery as claimed in claim 26, wherein said stacked cells are aligned such that the positive and negative terminal connectors of each said cell are positionally alternated to position the positive and negative terminal connectors adjacent to each other on adjacent cells.

28. The battery as claimed in claim 26, wherein said terminal connector interconnection means comprises conductive metal brackets.

29. The battery as claimed in claim 26, wherein said pressure integrity means comprises a pair of restraint plates positioned against the outermost cells of said cell stack, and means positioned externally of the cells for adjusting and maintaining the tension between said restraint plates.

30. The battery as claimed in claim 29, wherein said tension adjustment means comprises a plurality of tie bars.

31. The battery as claimed in claim 29, wherein said battery further includes strain gage members adapted for monitoring the pressure on said cells between said restraint plates.

32. The battery as claimed in claim 26, wherein said cell electrical insulation means comprises an insulating disc sized and shaped to cover the end surfaces of each said cell.

33. The battery as claimed in claim 32, wherein said insulating disc comprises polyimide.

34. The battery as claimed in claim 26, wherein said stacked cells are mounted on a thermal radiator base plate member.

35. The battery as claimed in claim 34, wherein said battery further comprises a plurality of thermal fins containing heating elements, each said thermal fin interconnecting one said cell to said radiator plate for thermally interconnecting said cell to said radiator plate.

36. The battery as claimed in claim 26, wherein said battery comprises a pair of said stacked cells aligned side by side with all said cells being electrically interconnected in series.

37. A secondary battery comprising:
   a plurality of secondary cells each being in the form of a generally cylindrical container having a diameter substantially greater than its axial length and a pair of positive and negative terminal connectors disposed on the circumferential sidewall surface of said substantially cylindrical container, said cells being arranged side-by-side in substantially parallel planes;
   means for electrically insulating said cells from each other;
   means for interconnecting the positive terminal connector of one cell with a negative terminal connector of an adjacent cell in electrical series; and
   a pair of restraint means sandwiching said aligned cells for maintaining pressure integrity of said cells and structural integrity of said battery.

* * * * *